United States Patent [19]
Flahive

[11] 3,852,513
[45] Dec. 3, 1974

[54] ELECTRICAL WIRING SYSTEM
[76] Inventor: Richard G. Flahive, 2665 Balboa Vista, San Diego, Calif. 92105
[22] Filed: Jan. 9, 1973
[21] Appl. No.: 322,138

[52] U.S. Cl.................. 174/55, 174/58, 248/27, 339/126 R
[51] Int. Cl............................................. H02g 3/12
[58] Field of Search ................. 174/58, 55, 56, 53; 220/3.3, 3.4, 3.5, 3.6, 3.9; 339/122, 125 R, 126 R, 123; 200/168 C, 168 D; 248/27

[56] References Cited
UNITED STATES PATENTS

| | | | |
|---|---|---|---|
| 989,854 | 4/1911 | Kruse | 220/3.4 |
| 1,206,431 | 11/1916 | Graybill | 220/3.4 |
| 1,835,554 | 12/1931 | Both | 174/55 |
| 2,042,620 | 6/1936 | Noyes | 174/58 |
| 2,828,394 | 3/1958 | Mayzik | 174/55 UX |
| 2,867,344 | 1/1959 | Nickell | 220/3.6 |
| 3,641,472 | 2/1972 | Phillips | 339/122 X |

Primary Examiner—J. V. Truhe
Assistant Examiner—David A. Tone

[57] ABSTRACT

The disclosure herein set forth involves an electrical wiring system wherein an electrical outlet device is formed as an integral sealed unit for flush wall mounting and which includes cooperating means to mount said device on a previously mounted hanger means; said hanger means also including means for securing an electrical cable for connection to said device; said device also being formed with socket means for conductively connecting said cable to said device.

2 Claims, 5 Drawing Figures

PATENTED DEC 3 1974 3,852,513

ELECTRICAL WIRING SYSTEM

DESCRIPTION OF INVENTION

The present invention relates to an electrical wiring system and has particular reference to a system of wiring for modular units of construction. More specifically the invention involves a new and novel construction for electrical outlet units such as switches and outlet plugs, which are self contained in that they perform all the functions of outlet box, service item and face plate.

It is a primary object of the present invention to provide an electrical outlet and mounting means which makes readily possible the prefabrication of wiring harnesses for use in the building industry, particularly in modular construction units.

It is a further object of the present invention to provide electrical outlet units such as wall switches and convenience outlets which may be quickly and easily installed, removed and repaired by the average layman without any risk of injury due to electrical shocks or without the risk of fires caused by electrical short circuits.

In the more detailed description of the invention hereinafter following and the drawings illustrative thereof, a standard type toggle switch has been illustrated. It will, however, be understood that this is for illustrative purposes only and the board principle of the invention will cover convenience outlets and other devices as well.

Figure 1:
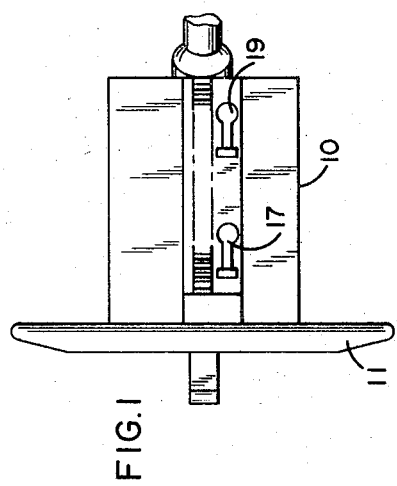
FIG. 1 is a top plan view of one form of a device embodying the principles of the invention.
Figure 2:
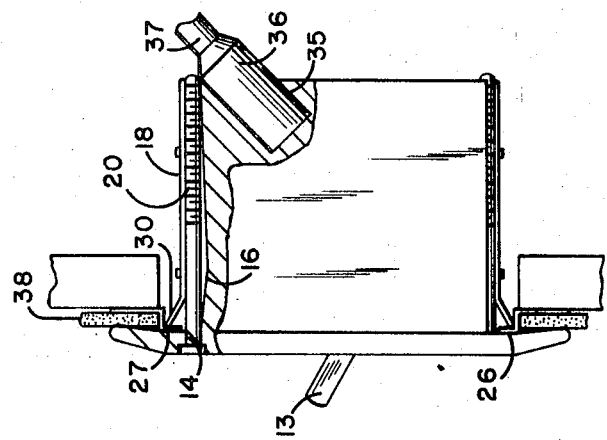
FIG. 2 is a side elevation of the device shown in FIG. 1 being partially fragmented.
Figure 3:
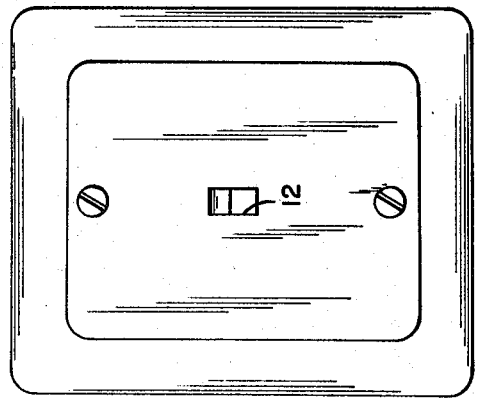
FIG. 3 is a front view of the device shown in FIG. 1.

Referring more specifically to FIGS. 1, 2 and 3, the toggle switch illustrated comprises in general a body 10 preferably of moulded plastic and being formed with peripheral flanges 11 to, in effect, form a face plate integral with the body 10. It is understood that the body 10 is hollow to contain the functioning parts of the switch or other electrical unit.

The faceplate is formed with an aperture 12 through which the switch lever 13 extends. The faceplate is also formed with apertures such as 14, the purpose of which will become apparent upon further description.

The body member 10 is formed with grooves 16 formed in the top and bottom walls thereof, said grooves are in registry with the apertures 14.

The body member 10 is also provided with a pair of outwardly extending T-shaped members such as 17. A plate 18 which is formed with slots 19 is disposed over the groove 16 and is slidably held in place by the T-shaped members 17 being disposed through said slots 19.

A threaded stud 20 is inserted through the aperture 14 into the groove 16 and in frictional bearing against the plate 18. It will be understood that the plate 18 is embossed or engraved so that its surface which is in contact with the stud 20 has grooves mating with the screw threads of the stud 20. Rotation of the stud 20 will cause movement of the plate 18 forwardly to thereby lock the outlet device in position.

Figure 4:
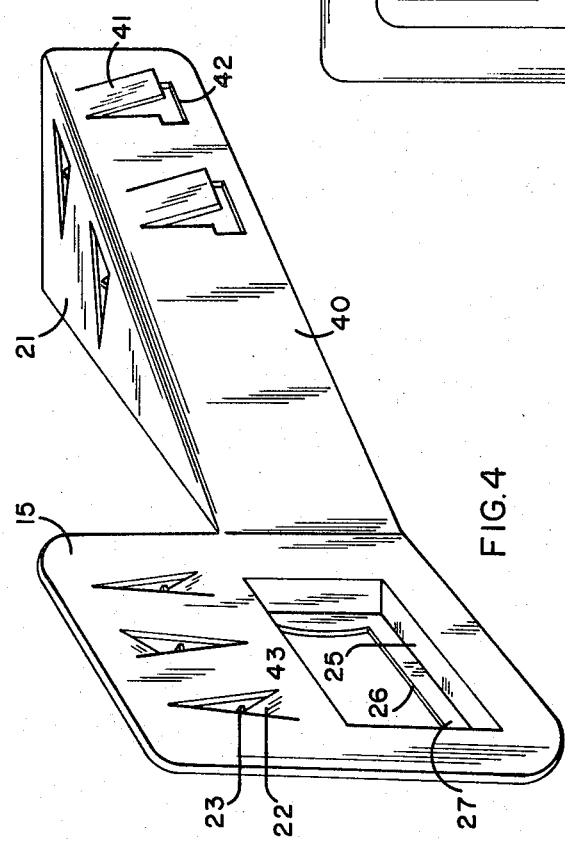
FIG. 4 is a perspective view of means for mounting said device shown in FIG. 1 in place in a wall construction.
Figure 5:
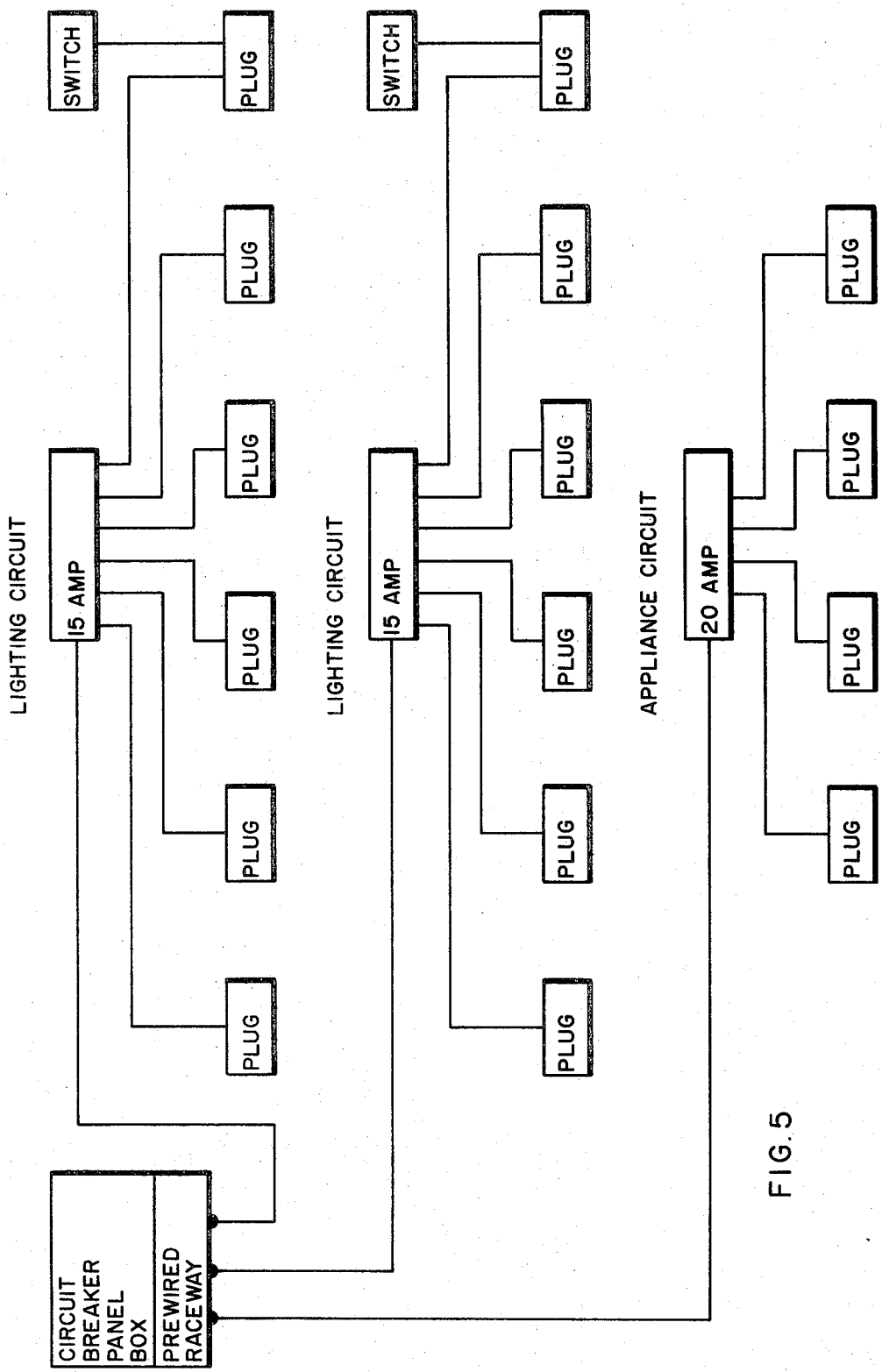
FIG. 5 is a schematic illustration of the possible prewired harnesses and means of using the invention.

Referring now to FIG. 4, the invention includes a mounting device formed preferably of sheet metal and comprising a plate portion 15 adapted to be positioned against the outer vertical face of a wall stud and plate surface 21 adapted to be positioned against the side vertical surface of said wall stud. Each of the plates 15 and 21 contain integral securing means such as tabs 22 formed with points 23 for driving into the stud.

The plate 15 is formed with an embossed portion 25. The embossed portion 25 is formed with an opening 26 adapted to receive the body 10 of the electrical device. The dimensions of the opening 26 are such as to form a lip 27 around the periphery thereof.

Referring again to FIG. 2 it will be noted that the outer end of the plate 18 contains an upwardly extending ear 30 which abuts against the inner surface of the lip 27. It will therefore be readily apparent that upon tightening of the screw stud 20 there will be a tight clamping action between the face plate 11 and the ear 30, against the lip 27.

The body 10 is also formed with a socket 35 adapted to receive a plug 36 secured to the end of an electrical cord or cable 37.

It will be apparent that the plug 36 and the socket 35 contain mating electrical connections.

The mounting device as illustrated in FIG. 4 is secured to the stud at the desired place in the construction prior to the application of finish wall surfaces such as plasterboard 38. Cables are installed as required and the plugs such as 36 are secured to the ends thereof.

It will be noted in FIG. 4 that the plate portion 21 is formed with a right angle flange 40 having upwardly extending tabs 41. The cable such as 37 is placed under the tab 41, a screwdriver or other prying tool is inserted through slot 42 and the tab 41 is bent downwardly to securely lock the cable 37 in place.

It will also be noted in FIG. 4 that the embossed portion 26 is formed with curved edges such as 43 to thereby facilitate the adjustment of switch body 10 to vertical position.

It will be readily apparent that the invention provides a new and more economical method of wiring building structures. Most of the connecting of cables to the finish outlet is done prior to the time that the cables are covered up, thereby eliminating a large degree of error.

Also most of the work of a dirt distributing nature is done before the finish work such as painting, thereby eliminating the possibility of unsightly staining and soiling of the finished work. Also it is easier and therefore more economical to do the electrical wiring and connections while the walls are still open.

It will be further understood that the foregoing is illustrative of one form of the invention and is not intended as a limitation on the true scope of the invention which is set forth in the claims.

I claim:

1. An electrical outlet device comprising:
    a hollow body member having an electrical device disposed therein and a peripheral flange extending laterally from the face thereof to define a face plate;
    a pair of locking plates, slidably disposed on opposite sides of said body;

means extending through the said face plate to cause transverse movement of said slideably locking plates;

means mountable to a wall and being formed with an aperture defined by inwardly extending flanges, said body member being disposed in said aperture whereby, upon movement of said locking plates, said locking plates and the outer flanges of said face plate grip said inwardly directed flanges to thereby mount said electrical outlet device on said wall.

2. An electrical outlet device as described in claim 1 whereby said hollow body is formed with a cable receiving socket.

* * * * *